(12) United States Patent
Lanning

(10) Patent No.: US 7,859,856 B2
(45) Date of Patent: Dec. 28, 2010

(54) TAP BOARD

(76) Inventor: Eric J. Lanning, 284 Marti Way, San Jose, CA (US) 95136

( * ) Notice: Subject to any disclaimer, the term of this patent is extended or adjusted under 35 U.S.C. 154(b) by 1101 days.

(21) Appl. No.: 11/552,123

(22) Filed: Oct. 23, 2006

(65) Prior Publication Data
US 2007/0266182 A1 Nov. 15, 2007

Related U.S. Application Data

(60) Provisional application No. 60/774,687, filed on Feb. 17, 2006.

(51) Int. Cl.
*H01R 12/16* (2006.01)
(52) U.S. Cl. .................. 361/788; 714/39; 714/758; 361/803; 361/728; 361/729; 361/737; 361/784; 439/79; 439/540
(58) Field of Classification Search .......... 361/803, 361/788; 714/39
See application file for complete search history.

(56) References Cited

U.S. PATENT DOCUMENTS

| | | | | |
|---|---|---|---|---|
| 4,935,864 A | * | 6/1990 | Schmidt et al. ........... 363/141 |
| 5,260,970 A | * | 11/1993 | Henry et al. ............. 375/224 |
| 5,316,488 A | * | 5/1994 | Gardner et al. ............ 439/79 |
| 5,625,805 A | * | 4/1997 | Fenwick et al. ........... 713/503 |
| 6,352,434 B1 | * | 3/2002 | Emmert ................... 439/65 |
| 6,985,967 B1 | * | 1/2006 | Hipp ....................... 709/250 |
| 2001/0025353 A1 | * | 9/2001 | Jakel ........................ 714/37 |
| 2004/0158793 A1 | * | 8/2004 | Blightman et al. ......... 714/758 |
| 2005/0040233 A1 | * | 2/2005 | Korber et al. ............. 235/440 |

* cited by examiner

*Primary Examiner*—Hung S Bui
*Assistant Examiner*—Steven Sawyer
(74) *Attorney, Agent, or Firm*—Workman Nydegger

(57) ABSTRACT

A protocol analyzer for analyzing traffic on a bus. A tap card is used to tap into a bidirectional bus. The tap provides a pass through connection from the card to the host and taps off of the bus. While tapping off the bus, stubs lengths are minimized and input capacitance is minimized. A repeater that preferably has no internal termination provides a differential input and a differential output or a single ended output. The bus lines are input to one of the inputs in the differential inputs and a reference voltage is provided to the other differential input. The reference voltage enables the tap to determine if the data is high or low. A jumper is also included in the tap such that the reference voltage can be selected from the host or from the pod.

22 Claims, 4 Drawing Sheets

TAP BOARD

CROSS REFERENCE TO RELATED APPLICATIONS

This application claims the benefit of U.S. Provisional Application Ser. No. 60/774,687 filed Feb. 17, 2006 and entitled TAP BOARD, which application is incorporated by reference in its entirety.

BACKGROUND OF THE INVENTION

1. The Field of the Invention

The present invention relates to analyzing signals between a host and a device by tapping the bus. More particularly, embodiments of the invention relate to a tap for tapping a bus between a host and a device.

2. The Relevant Technology

Protocol analyzers are devices that detect, diagnose, and solve problems that occur on networks or over busses used by hosts and attached devices. Typically, protocol analyzers view traffic on the network, over a bus or over a connection as the traffic occurs. This enables the traffic to be monitored in real time in some instances. As the data or traffic is being monitored, the protocol analyzer may detect a problem or a defined condition. At this point, the analyzer triggers and captures the data present on the network or on the bus. The amount of data captured can depend on the size of the analyzer's buffer. The analyzer can also be configured such that the captured data represents data that occurred before the triggering event, after the triggering event, and/or both before and after the triggering event. In addition, data can also be captured without a triggering event. Rather, data can simply be captured until the buffer is full. In effect, the capture is a snapshot of the data that was present on the network or bus around the time that a problem occurred or a condition was detected or when a capture was initiated. The captured data can then be analyzed to help resolve many problems and improve communications in a network or between a host and a device.

Some protocols, however, are difficult to implement in analyzers. SD (Secure Digital Cards), SDIO (SD Input/Output Cards, MMC (Multimedia Cards) and CE-ATA (Consumer Electronics-Advanced Technology Attachment) are examples of protocols that are difficult to analyze.

Some of the reasons for the difficulty in implementing a protocol analyzer for these and other protocols are related to the physical sizes of devices that use SD, SDIO, MMC or CE-ATA. Other reasons are related to the cost. CE-ATA connectors, for example, have a limited number of insertion cycles. Because protocol analyzers are repeatedly connected and disconnected, cost can become a significant issue when analyzing CE-ATA. In addition, many consumer devices do not operate at the same voltage levels. This can complicate the issue of connecting a system to a protocol analyzer when the voltage levels are not known beforehand. When the bus is electrical in nature rather than optical, there are also issues related to impedance matching and capacitive loading.

BRIEF SUMMARY OF THE INVENTION

These and other limitations are overcome by embodiments of the invention, which relate to a tap or a tap board and more particularly to a tap for use in performing protocol analysis in consumer electronics. A tap is provided that enables signals present on a bus of a consumer device to be analyzed with a protocol analyzer.

The tap is designed to be cost effective and interact with a protocol analyzer through a detachable pod or directly with the protocol analyzer. The tap provides a pass through bus that is designed to tap the signals present on the bus while minimizing or reducing the impact any impedance mismatches or capacitive loading that may be introduced. In particular, the length of any stubs that may impact impedance matching on the bus is minimized.

In one embodiment, the tap includes a printed circuit board (PCB). The PCB typically has a form factor that enables it to work with a consumer device and/or a protocol used by the consumer device, for example SD, SDIO, MMC or CE-ATA. A pass through bus is formed on at least one side of the PCB. In one example, the bus begins on one side of the PCB and then transfers to the other side of the PCB using vias. This enables a repeater chip to be connected directly to some of the traces in the bus.

The repeater chip is configured to have a short stub, thereby reducing the impact of impedance mismatching, no internal termination, and reduced input capacitance. The signals tapped from the bus are then output, for example, as single ended outputs or differential outputs. In another embodiment, the lines are routed from one end of the PCB to the other end. The pins of the repeater are used to tap off the signals on the bus. In this case, vias are not needed, there are no tap traces, and stub lengths are kept to a minimum.

The inputs to the repeater chip are differential inputs as well. One of the differential inputs connects to the bus lines or traces, and the other input is connected to a circuit that generates a reference voltage. This enables the tap to differentiate between high and low signal states without knowing the operating voltage of the system under test. In addition, the operating voltage can be obtained from the system under test or from the pod that receives the signals on the bus through an interface.

The tap also includes a memory that stores a tap ID. Alternatively, the tap ID can be hard-coded on the tap. The tap ID enables the pod or the analyzer to identify the appropriate protocol being tapped and to process the tapped signals or data as required by the identified protocol.

These and other advantages and features of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a particular description of the invention will be rendered by reference to specific embodiments thereof which are illustrated in the appended drawings. Understanding that these drawings depict only typical embodiments of the invention and are not, therefore intended to be considered limiting of its scope, the invention will be described and explained with additional specificity and detail through the use of the accompanying drawings in which.

DETAILED DESCRIPTION OF THE PREFERRED EMBODIMENTS

Figure 1:
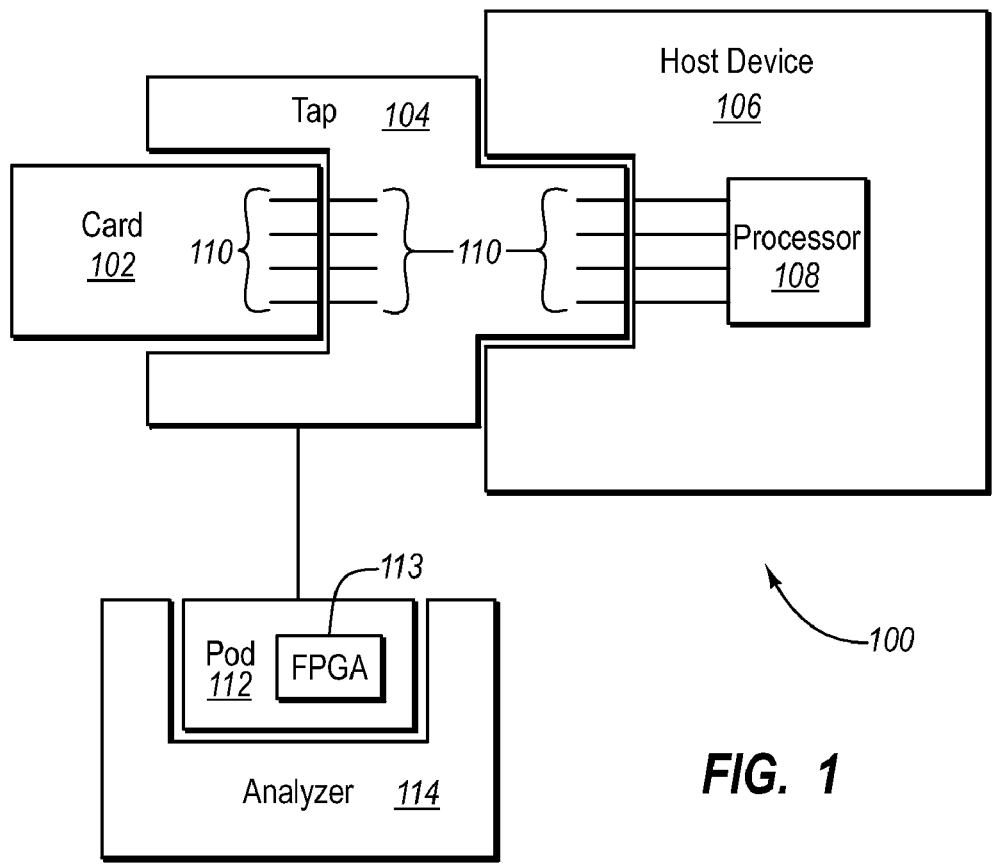
FIG. 1 illustrates an exemplary environment for implementing embodiments of the invention.

Embodiments of the invention overcome the limitations of conventional systems and relate to systems and methods for performing protocol analysis. More particularly, embodiments of the invention relate to a tap board that can be used to tap the busses of systems that support protocols including, but not limited to, SD, SDIO, MMC and CE-ATA protocols or the combination thereof. In some instances, a CE-ATA device may be included in a device that otherwise may comply with MMC or other protocol. For example, a hard drive complying with CE-ATA may be embedded in a device that interfaces with a host using MMC protocol. Embodiments of the invention further enable tapping off of a bus and accounting for different operating voltages that may be encountered on different busses. As used herein, a bus can include data lines, command lines, a clock, voltages provided by a host to a device, ground, and the like or any combination thereof. Embodiments of the invention can tap some or all of the lines that are included in any given bus.

A protocol analyzer in accordance with embodiments of the invention includes an analyzer, a pod and a tap board or tap. The tap connects or interfaces with the pod and the pod, in turn, interfaces with the analyzer. The tap generates differential signals or singled ended signals that are provided to the pod. The tap also provides an ID that enables the pod to determine what type of tap is attached. After identifying the type of tap that is attached, the pod can then identify the specific signals received from the tap and operate on them appropriately before providing the signals and/or other data to the analyzer. In addition, embodiments of the invention encompass both differential signaling and/or single ended signaling. Some of the differential inputs/outputs can also be implemented as single ended inputs/outputs.

As discussed in more detail below, the pod typically includes an FPGA, micro-processor or application specific integrated circuit (asic) that processes the signals from the bus of the system being analyzed. The FPGA or microprocessor can be pre-programmed or programmed once the type of tap is determined. The pod may also include control status indicators such as LEDs. In one embodiment, the tap and the pod are separate and are connected using a cable. This enables a relatively inexpensive tap to be manufactured which can be replaced as necessary. As previously indicated, some connectors have a relatively low insertion cycle count and requiring replacement of the pod is more costly than replacing a tap.

The pod can connect to the tap board in at least two different ways. The tap board or tap can connect directly with the connector and/or through a cable. To insure signal integrity, the LVDS (Low Voltage Differential Signaling) signaling may be used. Embodiments of the invention incorporate LVDS signaling in the tap to determine whether signals on the bus are high or low as described below. In some instances, voltage levels may be translated to comply with various signaling requirements of the tap, the pod, and/or the analyzer. For example, LVTTL signals in the FPGA may be converted to LVDS signals.

FIG. 1 illustrates an exemplary environment for implementing embodiments of the invention. FIG. 1 illustrates a system 100 that includes, in this example, host 106 that connects with a card 102. The host 106 and the card 102 represent the system under test. The card 102 represents various media cards that include, but are not limited to, MMC (Multi Media Card) Card, RS-MMC (Reduced Size-MultiMedia Card), MMCplus, MMCmobile, DV (Dual Voltage) MMC cards, CE-ATA (Consumer Electronics-Advanced Technology Attachment) devices, SD (Secure Digital) Cards, DV (Dual Voltage) SD Cards, SDIO (SD Input/Output), XD cards, Memory Stick, and other cards or devices including drives or any combination thereof.

The host 106 is typically configured to read and/or write to the card 102 and the bus is typically electrical and bidirectional. The host 106 represents, by way of example and not limitation, consumer devices such as personal digital assistants, digital cameras, personal audio players, digital media players, digital recorders, cellular telephones, laptop computers, and the like or any combination thereof.

The communication between the card 102 and the host 106 occurs over the contacts 110 that represent the bus or connection between the card 102 and the host 106. The bus is a pass through bus in one embodiment. The tap 104 is a device that enables the analyzer 114 to view the traffic occurring on the bus between the card 102 and the host 106 with minimal interference to the bus. The form factor of the tap 104 is often dependent on the form factor dictated by the host 106 and/or the corresponding card 102. In some embodiments, the tap 104 may be configured to accept multiple form factors and/or cards that may use different protocols.

The tap 104 is separate, in one embodiment, from the pod 112 for several reasons. Some protocols have connectors that have a low insertion cycle count as previously described and the ability to replace the tap 104 when the connectors fail is advantageous compared to replacing the entire pod 112. A detachable tap 104 also facilitates use of the analyzer 114 in size constrained areas and for some testing situations, such as vibration testing.

The data on the bus between the card 102 and the host 106 is received at a pod 112 from the tap 104. The pod 112 is adapted to connect with the analyzer 114 although embodiments of the invention contemplate a pod 112 that is integrated with the analyzer 114. Also, the pod 112 can be reprogrammed for use with different protocols in some instances. When the pod 112 is detachable, the removability of the pod 112 from the analyzer 114 permits the analyzer 114 to be adapted to multiple busses, network connections, etc, by selecting the appropriate pod.

The pod 112 may receive an ID signal from the tap 104 that indicates how the pod 112 should handle the signals being tapped. The tap ID may identify the type of tap, the expected protocol of the bus, and the like. Similarly, the pod 112 may generate an ID signal that can be interpreted by the analyzer 114 such that the analyzer 114 can interpret the data received from the pod 112. Also, the pod ID may be used to program the pod to process the data in an appropriate manner.

In one embodiment, a pod 112 can be used with multiple taps. For instance, the pod 112 may be used with an MMC/SD tap, a CE-ATA tap, or another tap. For a given tap or for a given protocol, the FPGA 113 can be programmed to prepare or decode the signals that are tapped according to the requirements of various protocols. For example, the FPGA can be programmed to handle multiple protocols. In this case, the pod uses the tap ID to determine how to handle the data from the tap. Alternatively, the analyzer can use the tap ID and/or the pod ID to program the FPGA to handle or to decode the signals received from the bus. Typically, the actual programming of the FPGA is performed through an EEPROM, or through Select-Map pins through software.

For example, the specific protocol decoded by the pod is selected based on the ID signal provided by the attached tap. Alternatively, the pod 112, after receiving the ID signal, can then be appropriately programmed by the analyzer 114. In this example, the pod 112 is typically configured for the SD, SDIO, MMC or CE-ATA protocols. The pod 112 can support state listing decoding, command listing decoding, timing waveform, pre-capture filtering, triggering, statistics including real time statistics, histogram, post-capture statistics and filtering, tree view of the captured data, and other protocol functions.

Figure 2:
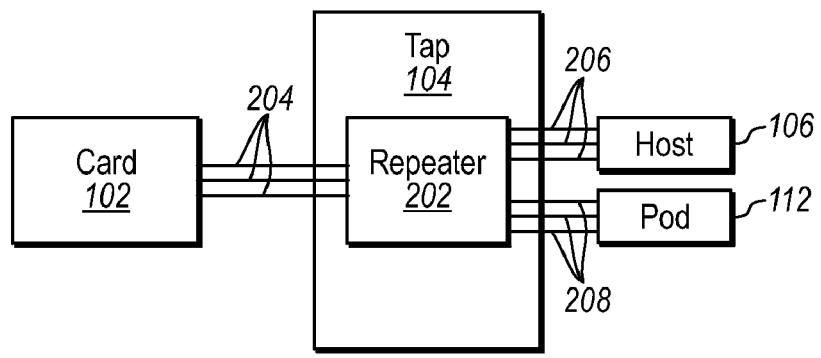
FIG. 2 illustrates one embodiment of a tap that interfaces with a bidirectional bus between a card and a host.

In one embodiment, the tap 104 is a pass-through tap in the sense that the digital signals are not retimed by the tap 104. Also, the bus may be a bi-directional bus. FIG. 2 illustrates an embodiment of the tap 104 that includes a repeater 202. The signals 204 from the card 102 are received by the repeater 202 and then passed through as the signals 206 to the host 106. The signals are also delivered as the signals 208 to the pod 112.

In one embodiment, the signals are tapped off of the bus and then passed through the repeater 202. Thus, the signals 204 and the signals 206 are the same signals. The tap is configured to tap off of the bus lines and provide the bus lines to the repeater 202. More specifically, the signals 208 have been tapped off of the bus and then passed through the repeater 202.

Figure 3A:
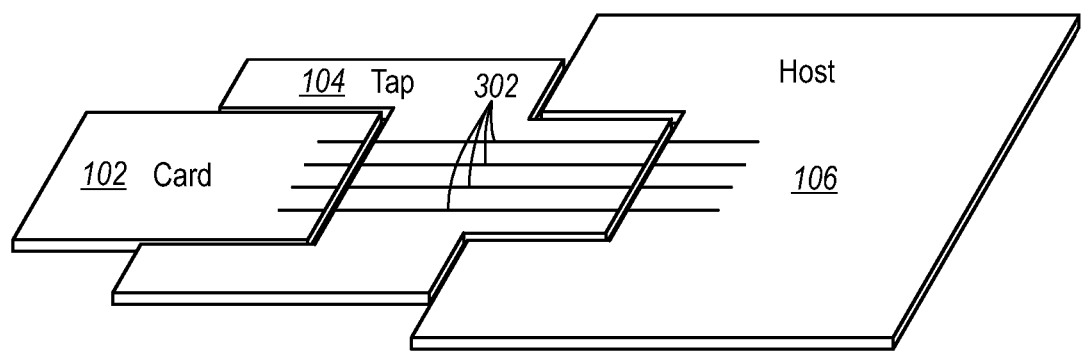
FIG. 3A illustrates an exemplary embodiment of a first side of a tap board illustrating connections between a device and a host.
Figure 3B:
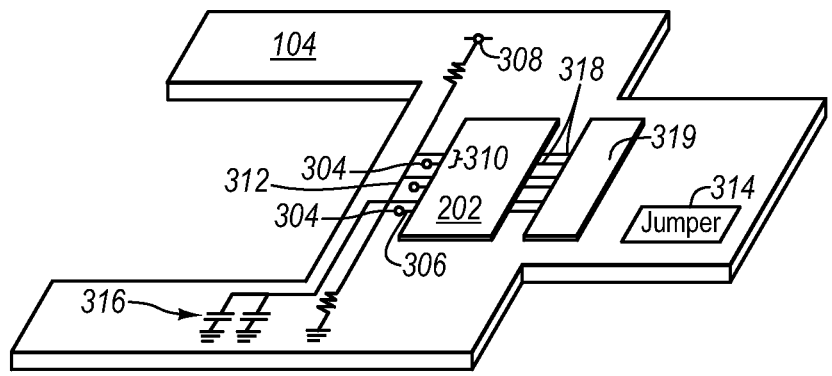
FIG. 3B illustrates an exemplary embodiment of a second side of a tap board that taps the bus shown in FIG. 3A and delivers the tapped signals to a pod.

FIGS. 3A and 3B illustrate opposite sides of an exemplary tap or tap board. In this embodiment, the tap includes a printed circuit board (PCB) with various circuit elements including lines (or traces), vias, and the like. FIG. 3A illustrates the bus 302 that connects the card 102 with the host 106. As shown in FIG. 3A, the bus 302, which includes multiple data lines, is preferably as short as possible to minimize the impact of the tap 104 on the operation of the system under test. The bus 302 can be bidirectional and/or electrical. The tap 104 provides a pass through bus 302 from the card 102 to the host 106.

FIG. 3B illustrates the other side of the tap 104. The tap 104 includes a repeater 202 that connects to the bus 302 using the vias 304 in this example. Preferably, there is no internal termination in the repeater 202 and the stub 306 is kept as short as possible to minimize the impact of impedance mismatches on the transmission of data between the card 102 and the host 106.

The inputs to the repeater 202 are differential inputs in this example. One of the inputs to the differential input 310, for example, is a line from the bus that taps the line through the corresponding via. The other input to the differential input 310 is a reference voltage from the circuit 308. In this example, the circuit 312 uses the voltage from the host 106 as the reference voltage and then uses a voltage divider to generate the inputs to the repeater 202. A filter 316 may also be included in the circuit 312 in order to maintain a stable reference voltage. The voltage divider generates a reference voltage that can be used to determine whether the data or voltages on the bus 302 are high or low. Using the voltage provided by the host to generate the reference voltage enables the data on the bus 302 to be properly interpreted without knowing the operating voltage levels of the host 106 or the card 102. Further, the repeater 202 or other module or integrated circuit on the tap 104 may provide translation of the signals to a standard that is understood by the pod or by the analyzer. For example, the output of the repeater 202 may be LVDS signals.

In this example, the outputs of the repeater 202, represented by the output 318, are differential outputs, although embodiments of the invention also contemplate single ended outputs. The differential outputs 318 can be provided to a connector 319 that is used to connect the tap 104 with a pod 114 as described with reference to FIG. 1. A differential output ensures better signal quality over the length of any connecting cable between the tap 104 and the pod 112.

As previously indicated, the bus 302 may be a bidirectional bus. This is one reason for running the signals straight through from connector to connector as illustrated in FIG. 3A and for tapping the signals as illustrated in FIG. 3B. The repeater 202 preferably has a low input capacitance to ensure that the overall line capacitance does not exceed any specifications.

In one embodiment, the circuit 312 may draw current from the host 106. The jumper 314 can be set such that the reference voltage is provided by the pod instead of from the host 106. Thus, the jumper 314 enables the selection of the interface voltage that is derived from the host or that is supplied by the pod. When the reference voltage is received from the pod, it can also be user-configured. For example, the pod may include a DAC (Digital to Analog Converter) that generates the appropriate voltage level for the card. The reference voltage can be user controlled and can also be adjusted or fine tuned as needed.

Figure 3C:
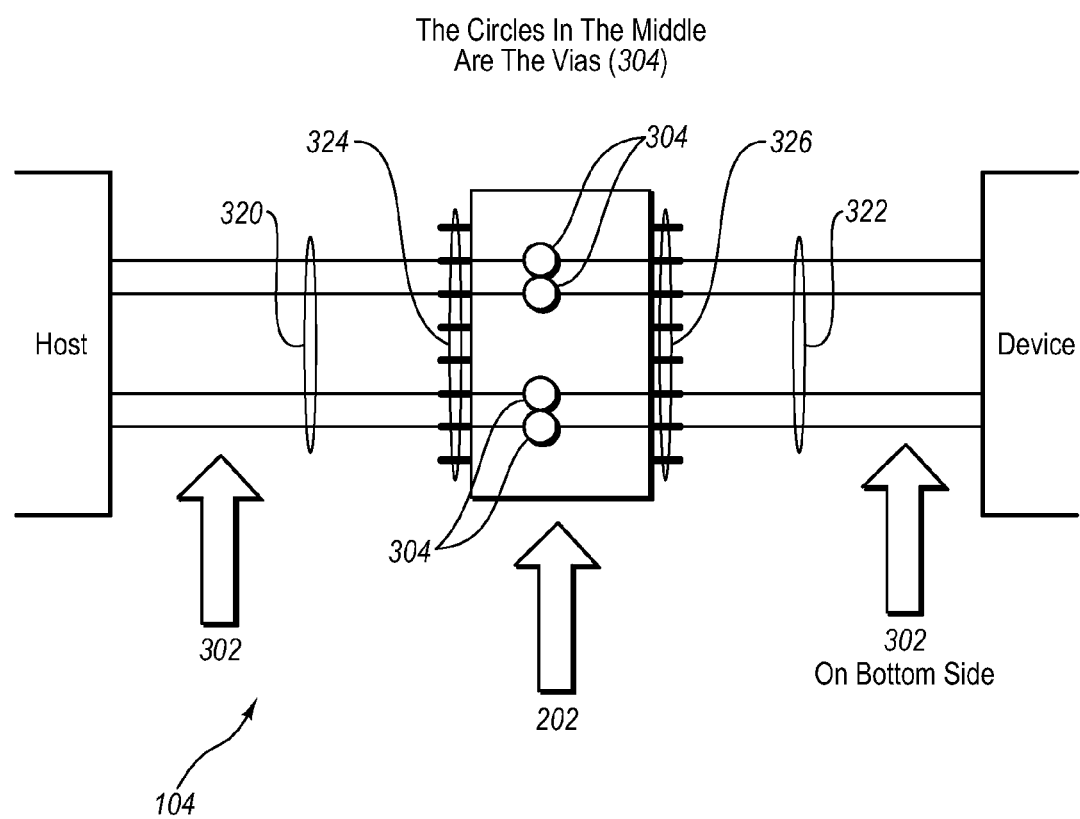
FIG. 3C illustrates another embodiment of a tap board.

FIG. 3C illustrates another embodiment of the tap 104 which may be used, for example, with SD/MMC or CE-ATA. In this case, the bus lines 320 (often formed as traces on a printed circuit board) are on a first side of the tap 104 and the bus lines 322 or formed on the other side of the tap 104. The vias 304 are used, in this example, to connect the bus lines 320 with the bus lines 322. The pins 324 of the repeater 202, in this example, can be connected directly to the bus lines 320. As a result, the stub length is minimized and limited to the pin lengths.

Because the vias 304 effectively transfer the bus lines 320 from one side of the tap 104 to the other side of the tap 104, the output pins 326 of the repeater 202 are on the opposite side of the tap 104 from the bus lines 322 in this example. As stated previously, this can minimize the length of the stub to the length of the pins 324 by connecting the pins 324 directly to the bus lines 320. In this example, the bus lines 320 and the bus lines 322 constitute the pass through bus provided by the tap 104.

One of skill in the art can appreciate that the bus lines that connect the device to the host can be on a single side of the tap 104 or on both sides of the tap 104 as described herein. In addition, the repeater 202 can be mounted on either side of the tap 104. The traces or connection from the bus lines 302 to the repeater 202 can be adjusted as needed based on the placement of the repeater 202 relative to the bus lines 302.

In one embodiment, the interface between the pod and the analyzer can have multiple channels including single ended channels and/or differential channels. The pin count of the FPGA in the pod can be minimized by using a chip that may also perform signal translation for example, a LVTTL signal generated by the FPGA may be translated to an LVDS signal that may be required by the analyzer.

Software operating on the analyzer can read an ID of the pod to know which pod is being used. The software can also read the ID on the tap via the pod. This enables the analyzer software to identify how to handle any data that is tapped from the bus 302.

The interface between the tap and the pod typically includes a plurality of signals, as described above. The interface also includes Vcc, GND, a pod supplied reference voltage that can be selected by the jumper, and one or more ID lines. The ID lines enable the pod to determine the type of tap that is connected and to determine how to prepare the data tapped from the bus for the analyzer.

Figure 3D:
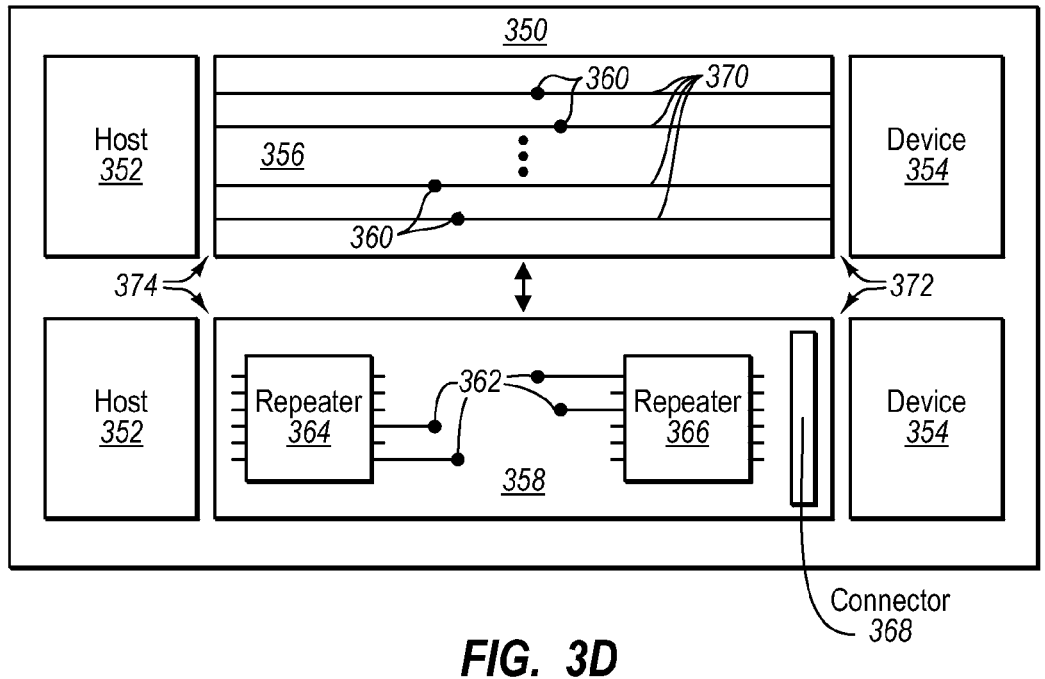
FIG. 3D illustrates another embodiment of a tap used in a system under test that includes a host and a device.
Figure 3E:
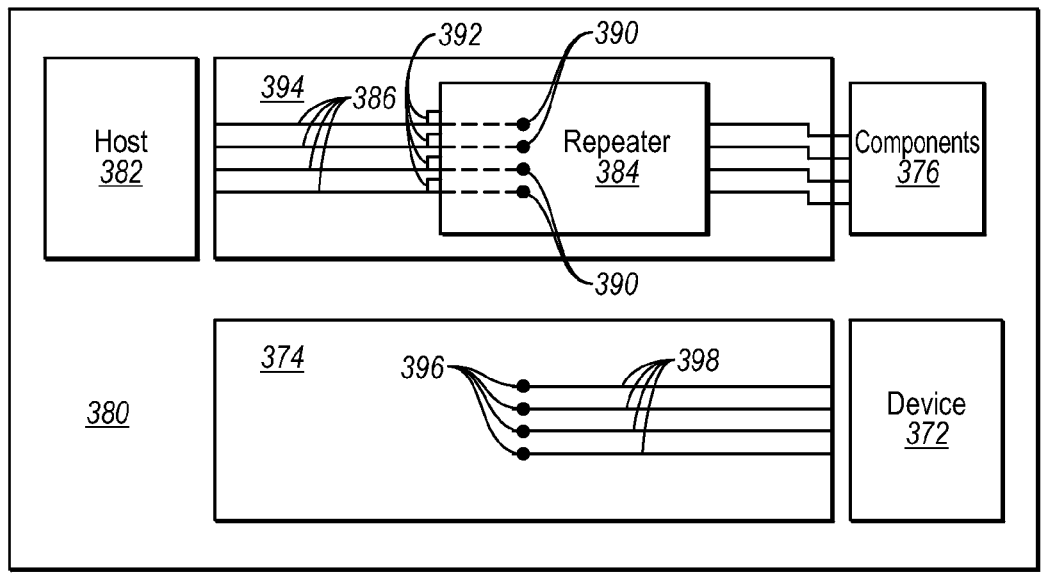
FIG. 3E illustrates another embodiment of a tap used in a system under test that includes a host and a device.

FIG. 3D and FIG. 3E illustrate additional embodiments of a tap or of a tap board as discussed herein. For clarity, some of the components or circuitry (such as the circuit 312) are not shown in FIGS. 3D and 3E. However, the embodiments illustrated in FIGS. 3D and 3E may also include similar circuitry or components.

FIG. 3D illustrates a tap used in a system under test 350 that includes a host 352 and a device 354 (such as a card). FIG. 3D illustrates a first side 356 and a second side 358 of a tap. On the side 356, a bus 370 is provided between the host 352 and the device 354. Providing a bus 370 in this manner minimizes the disruption to the communication between the host 352 and the device 354, which may be bidirectional in some instances. The connection or interface 374 from the tap to the host 352 is on the same side 356 of the tap as the connection or interface 372 from the tap to the device 354.

In order to provide the data or the communications occurring over the bus 370 to an analyzer for analysis, vias 360 have been formed in some or all of the bus lines 370 and appear on the other side 358 of the tap as the vias 362. The repeaters 364 and 366 can then connect to the bus 370 using traces or stubs from the vias 362. The trace or stub from each via 362 to a pin of a repeater 362 or 364 is often minimized. The arrangement or placement of the vias in the tap may be dependent on other circuit elements or components or to minimize stub length. The side 358 of the tap also provides the components 368, which may include a connector that can be used to connect the tap to a pod, for example. The components may also include other circuitry such as interface voltage, hard-coded tap ID, a memory, and the like. Traces from the repeaters to the components are only partially illustrated for clarity. In this example, the circuitry needed to implement the tap can be formed on the side 358, which taps the bus 370 using vias.

FIG. 3E illustrates another embodiment of a tap used in a system under test 380 that includes a host 382 and a device 372. In this example, the bus 386 begins on a first side 394 of a tap. The pins 392 of the repeater 384 can be inserted directly into the bus lines 386 as needed. Advantageously, this minimizes stub length. The bus lines may continue to the vias 390, which lead to the other side 374 of the tap as vias 396. The bus lines 398 then continue on the device 372. In this example, the components 376 can be connected with the repeater 384. The components 376, may include, a connector to a pod, a memory, a hard-coded tap ID, and the like or as described herein or any combination thereof.

The present invention may also be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A system for use in performing protocol analysis comprising:
   a tap board comprising:
      a first end that connects with a host;
      a second end that connects with a card that is under test;
      a memory that stores a tap ID;
      an interface that can detachably connect with a pod that is separate from the tap board, wherein the tap ID is provided to the pod over a first set of pins in the interface;
      a first side having a plurality of traces that form at least a portion of a bus between the card and the host;
      a repeater having a plurality of differential inputs, each differential input receiving a line from the bus and a reference voltage that is derived from a host voltage; and
      a plurality of connections that form a connection between one or more of the traces in the bus and first inputs in the plurality of differential inputs to the repeater;
   the pod that interfaces with the tap board via the tap board interface and that receives signals present on the bus of the card under test from the tap board, wherein the pod is configured with data based on the tap ID received from the tap board, and wherein the pod decodes the signals on the bus; and
   an analyzer that interfaces with the pod to perform protocol analysis on the data received from the pod, wherein the analyzer performs the protocol analysis on the data based on a pod ID received from the pod.

2. The system as defined in claim 1, wherein the bus is a bidirectional and electrical bus.

3. The system as defined in claim 1, wherein the bus is a pass through bus and wherein:
   the repeater and the plurality of connections are formed on a second side of the tap board; and
   the plurality of connections connect with vias that are used to tap the bus.

4. The system as defined in claim 1, wherein the bus is a pass through bus and wherein:
   the repeater and the plurality of connections are formed on the first side of the tap board;
   the plurality of connections include pins of the repeater that insert directly into the bus; and
   a second portion of the bus is located on a second side of the tap board.

5. The system as defined in claim 1, wherein the second side further comprises a second plurality of traces that form a second portion of the bus, wherein the second plurality of traces connects with the first plurality of traces using a plurality of vias from the first side to the second side.

6. The system as defined in claim 1, wherein the tap board further comprises a circuit connected to the repeater, the circuit generating a reference voltage.

7. The system as defined in claim 6, wherein the circuit is connected to a second input of each of the plurality of differential inputs to the repeater.

8. The system as defined in claim 7, wherein the circuit enables signals on the bus to be classified as high or low based on the reference voltage.

9. The system as defined in claim 1, wherein the repeater generates differential outputs.

10. The system as defined in claim 1, wherein a stub formed by connecting the repeater to the bus comprises a length of pins of the repeater.

11. A tap for use in performing protocol analysis on a system under test, the tap board comprising:
   a printed circuit board;
   a pass through bus formed on the printed circuit board, the pass through bus including a plurality of traces disposed on at least one side of the printed circuit board;
   a repeater chip disposed on a first side of the printed circuit board, wherein first pins of the repeater chip are connected directly to certain traces in the plurality of traces; and
   an interface connected to outputs of the repeater chips, wherein signals on the pass through bus are provided to a pod that is separate from the tap through the repeater chip and the interface; and a tap ID that is provided to the pod through the interface, wherein the tap ID identifies a particular protocol of the system under test and wherein the tap ID causes the pod to be programmed to operate on data of the particular protocol.

12. The tap as defined in claim 11, wherein the repeater chip comprises a plurality of differential inputs, each differential input including one of the first pins that is connected to a particular trace and a second pin, wherein the second pin is connected to a circuit that generates a reference voltage.

13. The tap as defined in claim 12, wherein the circuit generates the reference voltage that enables the tap board to determine whether signals on the bus are high or low without knowing an operating voltage of the system under test.

14. The tap as defined in claim 13, wherein the circuit operates from the operating voltage of the system under test.

15. The tap as defined in claim 13, wherein the circuit operates from a second operating voltage received from the pod.

16. The tap as defined in claim 15, wherein the second operating voltage is variable and can be changed until outputs from the tap are substantially correct.

17. The tap as defined in claim 11, further comprising a jumper that determines whether the circuit receives an operating voltage from the system under test or from the pod.

18. The tap as defined in claim 11, wherein the printed circuit board is adapted to work with a form factor of one or more of an MMC card, an RS-MMC card, a MMCplus card, an MMCmobile card, a DV MMC card, a CE-ATA device, an SD card, a DV SD Card, an SDIO card, an XD card, or a Memory Stick.

19. The tap as defined in claim 11, further comprising a plurality of vias, wherein the plurality of vias connect a first portion of the plurality of traces that are disposed on a first side of the printed circuit board with a second portion of the plurality of traces that are disposed on a second side of the printed circuit board.

20. The tap as defined in claim 19, wherein the plurality of vias are formed to minimize an impact of an impedance mismatch formed by stubs created when the repeater chip is connected with the plurality of traces.

21. The tap as defined in claim 20, wherein the repeater chip has no internal termination.

22. The tap as defined in claim 11, wherein the tap ID is stored in a memory or is hard-coded on the printed circuit board and readable by a pod.

* * * * *